United States Patent [19]

Nelson et al.

[11] Patent Number: 4,800,145
[45] Date of Patent: Jan. 24, 1989

[54] SUBSTITUTED PHTHALOAYANINE PHOTOCONDUCTOR AND CHARGE TRANSPORT PHASE

[75] Inventors: Anthony J. Nelson, Stockport; Peter J. Duggan, Rochdale, both of England

[73] Assignee: Imperial Chemical Industries, PLC, London, England

[21] Appl. No.: 73,193

[22] Filed: Jul. 14, 1987

[30] Foreign Application Priority Data

Aug. 6, 1986 [GB] United Kingdom ............... 8619238

[51] Int. Cl.$^4$ .......................... G03G 5/06; G03G 5/14
[52] U.S. Cl. ........................................ 430/58; 430/77; 430/78; 540/122; 540/123; 540/140
[58] Field of Search ....................... 430/58, 76, 77, 78

[56] References Cited

U.S. PATENT DOCUMENTS

| | | | |
|---|---|---|---|
| 3,816,118 | 6/1974 | Byrne | 430/78 X |
| 4,352,876 | 10/1982 | Suzuki et al. | 430/58 |
| 4,443,528 | 4/1984 | Tamura et al. | 430/56 |
| 4,507,374 | 3/1985 | Kakuta et al. | 430/76 X |
| 4,536,461 | 8/1985 | Nakatani et al. | 430/58 |
| 4,547,447 | 10/1985 | Ueda | 430/78 |
| 4,619,879 | 10/1986 | Kakuta et al. | 430/58 |

FOREIGN PATENT DOCUMENTS

1489394 10/1977 United Kingdom .

OTHER PUBLICATIONS

European Search Report EP 87306043 dated 10/14/87, "The Fourth International Congress on Advances in Non-Impact Printing Technologies", The Society for Imaging Science and Technology, Mar. 20-25, 1988, Technological Trends in the Development of Organic Photoconductors for New Applications, Nguyen and Weiss.

*Primary Examiner*—Roland E. Martin
*Attorney, Agent, or Firm*—Cushman, Darby & Cushman

[57] ABSTRACT

An organic photoconductor suitable for use in electroreprography comprising an electrically conducting support, a charge generating phase comprising a charge generator and a charge transport phase characterized in that the charge generator is a phthalocyanine compound in which each of at least four of the peripheral carbon atoms numbered from 1 to 16 in the phthalocyanine nucleus shown below is linked, by an atom from Group VA or Group VIA of the Periodic Table, to a carbon atom of an organic radical.

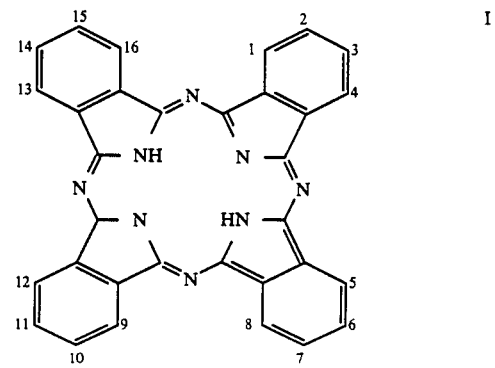

10 Claims, No Drawings

SUBSTITUTED PHTHALOAYANINE PHOTOCONDUCTOR AND CHARGE TRANSPORT PHASE

This specification describes an invention relating to an organic photoconductor for use as the photosensitive element of an electrophotographic device such as a copier or printer.

It has been common in such electrophotographic devices to use an inorganic photoconductive material such as selenium and its alloys, zinc oxide or cadmium sulphide, but in recent years it has become increasingly common to use organic materials.

Examples of such organic materials are the mixture of poly-N-vinyl carbazole and 2,4,7-trinitrofluoroenone described in U.S. Pat. No. 3484237, and the squaric acid-pyrazoline combination described in U.S. Pat. No. 3824099 in which the charge generation and charge transport functions are carried out by separate phases of squaric acid pigment and triaryl pyrazoline respectively. Such electrophotographic devices and their constituents are described in various patents, especially G.B. Pat. No. 2122211A (Ricoh) and U.S. Pat. No. 4302521 (Konishiroku) and references are made in the present specification to detailed descriptions of aspects of the present invention in these patents, hereinafter referred to as "Ricoh" and "Konishiroku".

It is a feature of the dual layer devices, in which the lower charge generation layer is overcoated with a charge transport layer of a p-type semiconductor (such as the pyrazoline) that the best photosensitivity is obtained when the photoreceptor is charged negatively, and this is also the case in the poly-N-vinylcarbazole trinitrofluoroenone combination. It is known that it is possible to obtain a photoconductor which is positive charging by reversing the order of construction of the dual-layer devices, that is by having the charge generation layer on top of the charge transport layer. However the pigment in the charge generation layer is then prone to mechanical damage and chemical degradation as it is exposed to the atmosphere. An alternative method of obtaining a positive-charging photoconductor is to use an n-type semiconductor such as 2,4,7-trinitrofluoroenone in the charge-transport layer, which is capable of transporting electrons to neutralise the surface positive charge. Yet another method of producing a photoreceptor suitable for positive charging is described in EP 0176221, in which a mixture of charge-generation material and charge-transport material in a binder is coated on top of a charge-transport layer. Such a system suffers from the disadvantage that the coating thicknesses must be carefully controlled, adding to the complexity of the construction.

The above-mentioned photoconductive devices are commonly used in both electrophotographic copiers and printers. In the copying process, a latent electrostatic image is formed on the surface of the charged photoconductor by exposure to light reflected from the document to be copied. This is then developed and transferred to paper to produce the final image. Electrophotographic printers use a similar system, except that the latent electrostatic image is formed by, for example, a modulated scanning light beam, commonly from a laser. Of particular interest is the light from semiconductor lasers, which is emitted in the near IR portion of the electromagnetic spectrum. Printers incorporating such lasers require photoconductive materials which are sensitive in this part of the electromagnetic spectrum, and examples of wavelengths commonly produced are 780, 830 and 1030 nm.

It has been found that certain substituted phthalocyanines have photoconductive properties when incorporated as the charge-generation material of an organic photoconductor with a p-type semiconductor charge-transport material. Furthermore certain of these substituted phthalocyanines have surprisingly higher photosensitivity when positively charged.

These substituted phthalocyanine compounds have absorption maxima in the visible to near infra-red region of the electromagnetic spectrum, e.g. from about 600 to 1500 nm, and more especially from 650 to 1100 nm.

A further surprising advantage of the present phthalocyanine derivatives is that they can be coated from an easily-prepared solution in an organic solvent, whereas most charge-generation materials, such as squaric acid pigments as described above, and most others commonly encountered require to be coated as dispersions.

According to the present invention there is provided an organic photoconductor (hereinafter referred to as an "OPC") comprising an electrically conducting support, a charge generating phase comprising a generator of charge-carriers (hereinafter called the "charge generator") and a transport phase capable of transporting charge associated with the charge carrier (hereinafter called the "charge-transport phase") characterised in that the charge generator is a phthalocyanine compound in which each of at least four of the peripheral carbon atoms 1 through 16 of the phthalocyanine nucleus, as shown in Formula I is linked by an atom from Group VA or Group VIA of the Periodic Table, to a carbon atom of an organic radical.

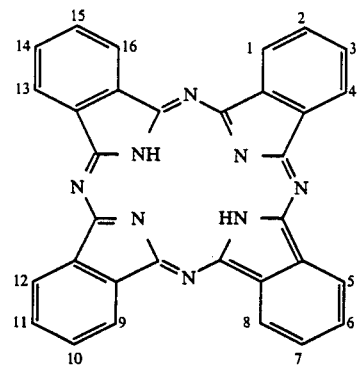

In a preferred class each of fifteen or sixteen, and more preferably sixteen, of the peripheral carbon atoms is linked to an organic radical by an atom from Group VA or Group VIA.

Compounds of especial interest, e.g. for use in laser printers, have an absorption peak above 650 nm, especially in the region from 650 to 1100 nm, and those of more especial interest have 90% of their absorption strength at or above 650 nm.

The organic radical may be an optionally substituted aliphatic, alicyclic or aromatic radical. Examples of suitable aromatic radicals are optionally substituted phenyl, phenylene, naphthyl, especially naphth-2-yl, naphthylene, pyridyl, thiophenyl, furyl, pyrimidyl, benzimidazolyl and benzthiazolyl. Aliphatic radicals are preferably from the alkyl and alkenyl series containing up to 20 carbon atoms, such as vinyl, allyl, methyl, ethyl, n-propyl, iso-propyl, butyl, pentyl, nonyl, dodecyl, octadecyl and octadecenyl. Alicyclic radicals are preferably homocyclic, especially cycloalkyl and cycloalkenyl, containing from 4 to 8 carbon atoms, such as cyclohexyl. The organic radical may be monovalent and attached to a single peripheral carbon atom through a single Group VA or Group VIA atom or it may be polyvalent, preferably divalent, and attached to adjacent peripheral carbon atoms through identical or different atoms from Group VA and Group VIA. Where the organic radical is polyvalent it may be attached to two or more phthalocyanine nuclei.

The organic radicals attached to the peripheral carbon atoms of the phthalocyanine nucleus through an atom from Group VA or VIA, and the atom of Group VA or VIA, may be the same or different. A preferred compound for use in the present invention comprises a pentadeca(alkylthio)mono(alkoxy)phthalocyanine in which the two alkyl groups are different, especially pentadeca(iso-propyl)mono(iso-amyloxy)-dihydrogenphthalocyanine.

Examples of substituents for the aromatic and heteroaromatic radicals are alkyl, alkenyl, alkoxy and alkylthio, and halo substituted derivatives thereof, especially those containing up to 20 carbon atoms, aryl, arylthio, especially phenyl and phenylthio, halogen, nitro, cyano, carboxyl, aralkyl, aryl- or alkyl-sulphonamido, aryl- or alkyl- sulphone, aryl- or alkyl-sulphoxide, hydroxy and primary, secondary or tertiary amino. Examples of substituents for the aliphatic and cycloaliphatic radicals are alkyl, alkoxy, alkythio, halo, cyano and aryl. In these substituents the alkyl and alkenyl groups preferably contain up to 20, and more preferably up to 4, carbon atoms and the aryl groups are preferably mono- or di-homo- or hetero-cyclic. Examples of substituents are methyl, ethyl, dodecyl, allyl, methoxy, ethoxy, methylthio, trifluoromethyl, bromine, chlorine, fluorine, phenyl, benzyl, $NH_2$, COOH, —$COOCH_3$, —$COOCH_2C_6H_5$, —$NHSO_2CH_3$, —$SO_2C_6H_5$, —$NHC_2H_5$ and —$N(CH_3)_2$.

Examples of suitable atoms from Group VA and Group VIA for linking the organic radical to a peripheral carbon atom of the phthalocyanine nucleus are oxygen, sulphur, selenium, tellurium and nitrogen or any combination of these. Where an organic radical is linked to adjacent peripheral carbon atoms the second bridging atom may be any atoms from Group VA or Group VIA and examples are sulphur, oxygen, selenium, tellurium and nitrogen. Where the linking atom is nitrogen the free valency may be substituted or unsubstituted e.g. it may carry an alkyl group, preferably $C_{1-4}$-alkyl or an aryl group, preferably phenyl.

The phthalocyanine nucleus is preferably metal free, i.e. it preferably carries two hydrogen atoms at the centre of the nucleus as shown in Formula I, but it may be complexed with a metal, halogeno-metal or oxy-metal derivative, i.e. it may carry one or two metal atoms, halogeno-metal or oxy-metal groups complexed within the centre of the nucleus. Examples of suitable metals, halogeno-metals and oxy-metals are copper, lead, cobalt, nickel, iron, zinc, germanium, indium, magnesium, calcium, palladium, chloroindium, gallanyl and vanadyl.

It has been found that by variation of the nature of the Group VA or VIA linking atom, or the organic radical, or the central atom(s) of the phthalocyanine nucleus, it is possible to alter to advantage both the wavelength of maximum absorption of electromagnetic radiation and also the physical properties (e.g. solubility) of the compounds of the invention.

Throughout this specification the symbols, $H_2Pc$ and MPc, in which M is a metal, e.g. Cu, Zn or Pb, will be used to indicate unmetallised and metallised phthalocyanines respectively.

Suitable compounds from the preferred class are those conforming to the following formulae:

$$M_kPc(XR)_n \qquad \qquad II$$

and $$M_kPc(X-Q-X)_p(XR)_q \qquad \qquad III$$

wherein
M is hydrogen, a metal atom, a halogeno-metal group or an oxy-metal group
k is the inverse of half the valency of M;
Pc is the phthalocyanine nucleus;
X is oxygen, sulphur, selenium, tellurium or NT where T is H, alkyl or aryl or mixtures thereof;
each R independently is a monovalent organic radical; or R and T together form an aliphatic or aromatic ring;
n is 15 or 16;
Q is a divalent organic radical;
p is an integer from 1 to 8;
q is an integer from 0 to 14;
and 2p+q is 15 or 16.

Examples of compounds conforming to Formulae II and III are:
pentadeca(n-butylthio)-CuPc
pentadeca(4-carboxylphenylthio)-CuPc
pentadeca(4-t-butylphenylthio)-CuPc
pentadeca(phenylseleno)-CuPc
pentadeca(isopropylthio)mono(isoamyloxy)-$H_2Pc$
hexadeca(phenoxy)-$H_2Pc$
hexadeca(phenoxy)-CuPc
hexadeca(cyclohexylthio)-ZnPc
hexadeca(ethoxy)-$H_2Pc$
pentadeca(phenoxy)mono(isoamyloxy)-$H_2Pc$
pentadeca(naphth-2-ylthio)-MgPc
pentadeca(naphth-1-ylthio)-CuPc
pentadeca(4-methoxyphenylthio)-CuPc
pentadeca(4-dodecyloxyphenylthio)-CuPc
pentadeca(4-methylthiophenylthio)-CuPc
pentadeca(phenylthio)-CuPc
pentadeca(4-butoxyphenylthio)-CuPc
pentadeca(n-dodecylthio)-CuPc
pentadeca(benzimidazol-2-ylthio)-CuPc
hexadeca(4-methylphenylthio)-CuPc
hexadeca(4-methylphenylthio)-ZnPc
hexadeca(anilino)-$H_2Pc$
hexadeca(4-methylphenylthio)-PbPc
hexadeca(4-methylphenylthio)-$H_2Pc$
hexadeca(4-chlorophenylthio)-NiPc
hexadeca(piperidino)-$H_2Pc$
hepta(4-methylphen-1,2-ylenedithio)-di(4-methyl-2-thiol phenylthio)-CuPc
hepta(4-methylphen-1,2-ylenedithio)-di(4-methyl-2-thiol phenylthio)-$H_2Pc$
octa(phen-1,2-ylenediamino)$H_2Pc$
hexadeca(diethylamino)-$H_2Pc$
hexadeca(ethylamino)-$H_2Pc$ Preferred values for, and examples of, the groups represented by R, Q and T are as given hereinbefore in respect of the organic radical. Where R and T together form an aliphatic or aromatic ring this may be, for example, pyrid-1-yl, pyrimid-1-yl, piperidin-1-yl, morpholin-1-yl, pyrrol-1-yl or pyrrolidin-1-yl.

The phthalocyanine compounds of the present invention can be prepared by heating a phthalocyanine compound carrying halogen atoms attached to the preripheral carbon atoms to which it is wished attach the Group VA or Group VIA atoms with at least four equivalents of an organic thiol, or an equivalent compound in which the sulphur in the thiol group is replaced by oxygen (alcohol or phenol), selenium (selenol), tellurium (tellurol) or NT (amine), in an organic solvent.

The compounds of the preferred class in which X is sulphur can be prepared by heating a phthalocyanine carrying at least fifteen halogen atoms atoms with at least fifteen equivalents of an organic thiol in an organic solvent. If the organic thiol also carries another substituent, such as a second thiol group or a hydroxy or a primary or secondary amino group, which will react with a halogen atom attached to an adjacent peripheral carbon atom on the phthalocyanine nucleus, the organic radical of the thiol may become linked to two adjacent peripheral carbon atoms.

Other compounds of the preferred class may be prepared by using, in place of the thiol, an equivalent compound in which the sulphur is replaced by oxygen, selenium, tellurium or a group, NT.

The organic solvent, which need not necessarily be a liquid at ambient temperatures and may only partially dissolve the reactants, preferably has a boiling point from 100° C. to 300° C. The organic solvent is preferably essentially inert although it may catalyse the reaction. Examples of suitable solvents are methylcyclohexanol, octanol, ethylene glycol, and especially benzyl alcohol, dimethylamine and quinoline.

Reaction is conveniently carried out under reflux, preferably from 100° C. to 250° C. in the presence of an acid binding agent, such as potassium or sodium hydroxide or sodium carbonate, to neutralise the halo acid formed. The product may be isolated by filtration or by distillation of the organic liquid. The isolated product is preferably purified by repeated recrystallisation from a suitable solvent, such as ethanol, chloroform or pyridine, and/or chromatography, using a silica-filled column and an aromatic solvent, such as toluene or xylene, as eluent.

The phthalocyanine compounds can also be prepared by heating an o-phthalic acid derivative, especially o-phthalonitrile (o-PN), carrying substituted thio, oxo, seleno, telluro or amino (-NT) groups. The process is conveniently performed in a solvent in the presence of a base. It may also be promoted by the addition of a catalyst, such as ammonium molybdate.

This process is analogous to the known method for preparing unsubstituted phthalocyanines from o-phthalic acid derivatives such as those described in Journal of the Chemical Society, (1938), pp 1157–63; Advances in Inorganic Chemistry (Radiochemistry), (1965), 7, p 27 and Chemistry of Synthetic Dyes, (1971), 5, pp 241–82.

The solvent preferably has a boiling point from 50° C. to 300° C., more preferably from 70° C. to 200° C. and need not be a liquid at ambient temperatures or completely dissolve the reactants. It is preferably essentially inert though it may interact with the base, catalyse the reaction or even partially replace the substituted-thio groups in the phthalocyanine compound. Preferred solvents are aliphatic alcohols such as iso-amyl alcohol, octanol and benzyl alcohol.

Where an alcohol is employed as solvent it is possible for one or more alcohol residues to replace the substituted thio, etc. groups attached to the o-PN and become attached to a peripheral carbon atom of the phthalocyanine through oxygen atoms. Such a phthalocyanine, carrying one or more organic radicals attached through oxygen atoms, is a feature of the present invention The reaction is conveniently carried out between 100° C. and 150° C. or under reflux in the presence of a base, such as an alkoxide formed between an alkali metal and an alcohol, preferably an aliphatic alcohol. A particularly suitable base is lithium iso-amyl oxide because lithium phthalocyanines are generally soluble in alcohols.

Different metals may be introduced into the phthalocyanine by heating the o-PN with a suitable salt of the appropriate metal or heating lithium phthalocyanine with a solvent soluble compound of the appropriate metal. A metal-free phthalocyanine may be obtained by acidification of the lithium phthalocyanine, in some cases by merely contacting it with an acidic material, such as a silica-gel, or by heating it with a stronger acid, such as p-toluenesulphonic acid.

The structure of the OPC can take many different forms which are well-known to those skilled in the art. A number of these are shown in Konishiroku (FIGS. 1–5 and the relevant descriptions in Columns 2, 3 and 17) and the present OPC may be constructed in these or any other known forms. It is, however, preferred that the OPC is in the form of a layer comprising the charge generator sandwiched between an electrically conducting layer, the substrate, and a layer of the charge transport phase.

The substrate may be a supportive electrical conducting material, such as a metal support preferably in the form of a drum or a composite material comprising an insulating supporting material such as a sheet of polymeric material, e.g. a polyester sheet or film, coated with a thin film of a conducting material, e.g. a metal such as aluminium, in the form of a drum or a continuous belt.

The charge generating phase may comprise the charge generator alone preferably in the form of a layer deposited on the substrate, or the charge generator may be dispersed in a resin and formed into a layer on the substrate. Alternatively the charge generating phase may be evenly dispersed throughout the charge transport phase as described in Konishiroku, especially at Column 3, lines 21 to 54. When in the form of a layer, the charge generating phase preferably has a thickness from 0.01 microns ($\mu$) to 10$\mu$ and more preferably from 0.1$\mu$ to 3.0$\mu$. Examples of suitable resins for use in the charge generating phase are polycarbonate, polyester, polystyrene, polyurethane, epoxy, acrylic, styrene-acrylic, melamine and silicone resins and the other resins described in Ricoh and Konishiroku. Where the resin or charge generator does not have good adhesive properties with respect to the substrate, e.g. a polycarbonate resin, adhesion between the resin and the substrate may be improved by the use of an adhesive resin. Specific examples of suitable resins for use in the charge generating phase are LEXAN 141 Natural (available from General Electric Plastics, Europe) and Styrene-Acrylate Resin EO48 (available from Synres Nederland BV). A suitable adhesive resin for bonding the charge generating phase to the substrate is VMCA (available from Union Carbide).

The ratio of resin to charge generator in the charge generating phase may vary within wide limits as indicated in Konishiroku but is preferably from 2:1 to 1:2 by weight and conveniently 1:1.

The charge transport phase preferably comprises a layer of a resin containing a charge transport material. The layer of charge transport phase preferably has a thickness from 1.0 microns ($\mu$) to 50$\mu$ and more preferably from 5.0$\mu$ to 30$\mu$. Examples of suitable resins for use in the charge transport phase include one or more of polycarbonate, polyester, polystyrene, polyurethane, epoxy, acrylic, styrene-acrylic, melamine and silicone resins.

The charge transport material may be either an n-type semiconductor, such as 2,4,7-trinitrofluorenenone, for transporting electrons, or a p-type semiconductor, such as an oxadiazole, pyrazoline, di-, tri or tetraphenylmethane, hydrazone or substituted benzidine, for transporting holes. Suitable charge transport materials of these general types are described in Ricoh from page 7 line 13 to page 8 line 14, which list the above compounds and many other specific examples of suitable compounds.

The OPC may be prepared by any of the well-known methods for the preparation of such devices and such methods are described in the above mentioned references. See, for example, Ricoh, page 6 line 15 to page 7 line 12 and Example 1.

The invention is further illustrated by the following examples in which all parts and percentages are by weight unless otherwise indicated.

The following eighteen compounds, CG 1 to CG 18, are Charge Generators (CG) according to Formula II or Formula III.

CG 1

A mixture of 7.75 g of 4-methylphenylthiol, 3.36 g of KOH, and 10 ml of quinoline was stirred at 130° C. for 30 minutes and 2.67 g of hexadecachloro-H$_2$Pc was added. The mixture was then stirred at 180°–190° C. for 30 minutes, cooled to 50° C. and diluted with 30 ml of toluene. The crude material was passed through a silica gel column using toluene as eluent and the main fraction collected. This was isolated by evaporation to give 0.45 g of hexadeca(4-methylphenylthio)-H$_2$Pc.

CG 2

A mixture of 3.12 g of 4-methylphen-1,2-ylenedithiol, 2.24 g of KOH and 10 ml of quinoline was stirred at 30° C. for 30 minutes and 2.13 g of hexadecachloro-H$_2$Pc was added. The mixture was then stirred at 80° C. for 1 hour, 100° C. for 1 hour and 130° C. for 1 hour. It was then cooled to 80° C. and diluted with 100 ml of ehtanol (74 OP). After cooling to 25° C. the solid was filtered, washed twice with ethanol and dried. The crude material was passed through a silica column using chloroform as eluent. The main fraction was collected, isolated by evaporation and recrystallised from toluene/ether to yield 2.00 g of hepta(4-methylphen-1,2-ylenedithio)di(4-methyl-2-thiolphenylthio)-H$_2$Pc.

CG 3

A mixture of 7.36 g of tetra(ethylthio)-o-PN and lithium iso-amyloxide (comprising 0.525 g of lithium in 21 ml of isoamyl alcohol was stirred at 120°–130° C. for 2 hours and 130°–135° C. for a further 1 hour. After cooling to 50° C. 100 ml of methanol was added and the mixture cooled to 20° C. The precipitate which formed was filtered and washed well with methanol before being dissolved in toluene. The toluene solution was passed through a silica column using toluene as eluent. The main fraction was collected and isolated by evaporation to give pentadeca(ethylthio)mono(isoamyloxy)H$_2$Pc.

CG 4

A mixture of 3.83 g of tetra(cyclohexylthio)-o-PN and lithium iso-amyloxide (0.023 g of lithium in 7.5 ml of iso-amyl alcohol) was stirred at 120°–30° C. for 2½hours. After cooling to 25° C., a solution of 1.79 g of zinc chloride in 25 ml of anhydrous methanol was added. The mixture was then stirred at 25° C. for 1 hour and at 120°–30° C. for 30 minutes. After cooling to 20° C., the precipitate was filtered off and washed with methanol before being dissolved in toluene. The toluene solution was passed through a silica column, using toluene as eluent and the main fraction collected. The product was isolated by evaporation to give hexadeca(cyclohexylthio)-ZnPc.

CG 5–18

Further charge generators in accordance with Fromula II, as set out in Table 1, were prepared by the method of CG 3 using equivalent quantities of the appropriate tetra(substituted)-o-PN in place of the tetra(ethylthio)-o-PN of CG 3.

TABLE 1

| As in CG 3 (with tetra-(substituted-thio)-o-PN) | | |
|---|---|---|
| CG | Subs(thio)-o-PN | Product |
| 5 | tetraethyl | tetradeca(ethylthio)di(i-amyloxy)-H$_2$Pc |
| 6 | tetraethyl | (ethylthio)$_{15.3}$(i-amyloxy)$_{0.7}$-H$_2$Pc |
| 7 | tetra-n-propyl | hexadeca(n-propylthio)-H$_2$Pc |
| 8 | tetra-i-propyl | pentadeca(i-propylthio)mono(i-amyloxy)-H$_2$Pc |
| 9 | tetra-n-butyl | pentadeca(n-butylthio)mono(i-amyloxy)-H$_2$Pc |
| 10 | tetra-n-pentyl | pentadeca(n-pentylthio)mono(i-amyloxy)-H$_2$Pc |
| 11* | tetraethyl/ tetrabutyl | octa(butylthio)octa(ethylthio)-H$_2$Pc |
| 12# | tetra(ethyl/butyl) | octa(butylthio)octa(ethylthio)-H$_2$Pc |
| 13 | tetracyclohexyl | pentadeca(cyclohexylthio)mono(i-amyloxy)-H$_2$Pc |
| 14 | tetra-n-octyl | hexadeca(n-octylthio)-H$_2$Pc |
| 15 | tetra-s-butyl | tetradeca(s-butylthio)di(i-amyloxy)-H$_2$Pc |
| 16 | tetrabenzyl | pentadeca(benzylthio)mono(i-amyloxy)-H$_2$Pc |
| 17 | tetraphenyl | hexadeca(phenylthio)-H$_2$Pc |
| As in CG 3 (with tetra(substituted-oxy)-o-PN | | |
| CG | Subs(oxy)-o-PN | Product |
| 18 | tetra-phenoxy-o-PN | hexadeca(phenoxy)-H$_2$Pc |
| 19 | tetra-methoxy-o-PN | octa(methoxy)-octa(i-amyloxy)-H$_2$Pc |

*equimolar amounts of tetra(ethylthio)-o-PN and tetrabutyl-o-PN
randomly substituted tetra(ethylthio/butylthio)-o-PN having equal numbers of ethyl and butyl groups.

CG 20

This was made by the same process as CG 4 using an equivalent amount of tetra(isopropylthio)-o-PN in place of the tetra(cyclohexylthio)-o-PN to give hexadeca(isopropylthio)-ZnPc.

In all the above preparations structures were confirmed by elemental analysis and the products were characterised by the determination of melting points, absorption maxima and/or extinction coefficients.

Suitable solvents for the charge generator from which it may be deposited on the substrate include volatile hydrocarbons and chlorinated hydrocarbons especially alkanes and cyloalkanes such as hexane and cyclohexane; aromatics such as toluene; chlorinated alkanes such as chloroform, methylene dichloride and ethylene dichloride, and saturated heterocyclics such as tetrahydrofuran.

EXAMPLE 1

A photoconductive device was produced by coating 5% w/v solution of pentadeca(isopropylthio)isoamyloxy-$H_2Pc$ (CG8) in chloroform, using a 6 micron (wet thickness) wire-wound bar, onto 100 micron aluminised MELINEX (from ICI) which had been precoated with a 2% w/v solution of the adhesive polymer VMCA (from Union Carbide) using a 6 micron (wet thickness) wire-wound bar. After drying the phthalocyanine layer was overcoated with a solution of 3 g of 5-(p-diethyl-aminophenyl)-3-(p-diethylaminostyryl)-1-phenylpyrazoline in 43 g of a 6.98% ethylene dichloride solution of LEXAN 141 polycarbonate (from General Electric Plastics) using a 100 micron (wet thickness) wire-wound bar. The resulting device was dried at 70° C., for 3 hours.

EXAMPLES 2 to 23

A further 22 photoconductor devices were made by the method of Example 1 but using the charge generators (CG), and charge transport compounds (CTC) listed in Table 2 in place of the charge generator and charge transport compound used in Example 1.

TABLE 2

| | | CG 8 | | | |
|---|---|---|---|---|---|
| Example | CTC | CG | Example | CTC | CG |
| 2 | DEBDH | CG 8 | 13 | DPO | CG 20 |
| 3 | DMDMPP | CG 8 | 14 | DEDEPP | CG 3 |
| 4 | ECMPH | CG 8 | 15 | DBNPH | CG 9 |
| 5 | ECDH | CG 8 | 16 | DBNPH | CG 15 |
| 6 | DBDH | CG 8 | 17 | DBNPH | CG 5 |
| 7 | DMBDH | CG 8 | 18 | DPM | CG 1 |
| 8 | DMBMPH | CG 8 | 19 | DEDEPP | CG 1 |
| 9 | DEBMPH | CG 8 | 20 | DPM | CG 18 |
| 10 | DBNPH | CG 8 | 21 | DEBDH | CG 18 |
| 11 | DPM | CG 20 | 22 | DEDEPP | CG 18 |
| 12 | DEDEPP | CG 20 | 23 | DEDEPP | CG 19 |
| Control | DEDEPP | X-form $H_2Pc$ | | | |

The CTC shown in Table 2 are as follows:
DEBDH 4-diethylaminobenzaldehyde-diphenyl-hydrazone
DMDMPP 5-(4-dimethylaminophenyl)-3-(4-dimethylaminostyryl)-1-phenyl-pyrazoline
ECMPH 9-ethyl-3-carbazolecarboxaldehyde-N—methyl-N—phenylhydrazone
ECDH 9-ethyl-3-carbazolecarboxaldehyde-N,N—diphenylhydrazone
DBDH 4-dimethylaminobenzaldehyde-N,N—diphenylhydrazone
DMBDH 4-dibenzylamino-2-methylbenzaldehyde-N,N—diphenylhydrazone
DMBMPH 4-dimethylaminobenzaldehyde-N—methyl-N—phenylhydrazone
DEBMPH 4-diethylaminobenzaldehyde-N—methyl-N—phenylhydrazone
DBNPH 4-diethylaminobenzaldehyde-N—naphthyl-N—phenylhydrazone
DPM bis-(4-di-ethylamino-2-methylphenyl)-phenyl-methane
DEDEPP 5-(4-diethylaminophenyl)-3-(4-diethylaminostyryl)-1-phenyl-pyrazoline
DPO 2,5-bis-(4-diethylaminophenyl)-1,3,4-oxadiazole Each device was tested using a Kawaguchi Electric Works Model SP428 Electrostatic Paper Analyser, in the dynamic mode. The following properties were measured:

Surface Voltage: after charging for 10 seconds, followed by,

Dark Decay: % decrease after 5 seconds without illumination

Sensitivity: (in lux-sec), the light energy (E) (intensity x time) required to reduce the surface voltage to half its initial value.

Residual Voltage: voltage remaining after 10 x E light energy has fallen on the surface.

The results obtained are displayed in Table 3.

TABLE 3

| Ex. | Corona Voltage | Surface Voltage | Dark Decay (%) | Sensitivity (lux-sec) | Residual Voltage |
|---|---|---|---|---|---|
| 1 | −6 kV | 1180 | 11.0 | 13.5 | 85 |
| | +6 kV | 1380 | 10.0 | 6.5 | 60 |
| 2 | −6 kV | 1100 | 10.9 | 23.3 | — |
| | +6 kV | 1360 | 7.4 | 13.3 | — |
| 3 | −6 kV | 840 | 27.0 | 27.0 | 40 |
| | +6 kV | 1260 | 15.0 | 13.3 | 35 |
| 4 | −6 kV | 920 | 13.0 | 47.0 | 80 |
| | +6 kV | 1370 | 6.6 | 16.7 | 120 |
| 5 | −6 kV | 820 | 12.0 | 147.0 | 70 |
| | +6 kV | 1390 | 5.8 | 23.3 | 160 |
| 6 | −6 kV | 800 | 16.2 | 40.0 | 60 |
| | +6 kV | 1340 | 6.7 | 16.7 | 60 |
| 7 | −6 kV | 780 | 18.0 | 53.0 | 65 |
| | +6 kV | 1360 | 7.4 | 13.3 | 80 |
| 8 | −6 kV | 790 | 39.0 | 50.0 | 40 |
| | +6 kV | 640 | 31.3 | 26.7 | 40 |
| 9 | −6 kV | 1050 | 12.0 | 30.0 | 100 |
| | +6 kV | 1220 | 13.1 | 20.0 | 80 |
| 10 | −6 kV | 810 | 16.0 | 30.0 | 50 |
| | +6 kV | 1360 | 11.8 | 13.3 | 45 |
| 11 | −6 kV | 1024 | 12.1 | 88.0 | 160 |
| | +6 kV | 1340 | 10.5 | 30.0 | 230 |
| 12 | −6 kV | 610 | 50.8 | 25.0 | 30 |
| | +6 kV | 760 | 44.7 | 13.0 | 20 |
| 13 | −6 kV | 660 | 33.3 | 48.0 | 60 |
| | +6 kV | 544 | 39.3 | 40.0 | 50 |
| 14 | −6 kV | 970 | 15.5 | 37.0 | 60 |
| | +6 kV | 1320 | 10.6 | 16.7 | 50 |
| 15 | −6 kV | 710 | 16.9 | 42.5 | 40 |
| | +6 kV | 1360 | 13.2 | 12.5 | 70 |
| 16 | −6 kV | 810 | 12.3 | 27.5 | 60 |
| | +6 kV | 1290 | 19.4 | 12.5 | 60 |
| 17 | −6 kV | 570 | 31.6 | 32.5 | 30 |
| | +6 kV | 980 | 27.6 | 12.5 | 40 |
| 18 | −6 kV | 1180 | 13.6 | 50.0 | 160 |
| | +6 kV | 1430 | 6.3 | 20.0 | 180 |
| 19 | −6 kV | 950 | 26.3 | 87.0 | 40 |
| | +6 kV | 1350 | 13.3 | 40.0 | 50 |
| 20 | −6 kV | 1140 | 11.4 | 20.0 | 160 |
| | +6 kV | 1460 | 3.4 | 5.5 | 200 |
| 21 | −6 kV | 1020 | 9.8 | 27.5 | 80 |
| | +6 kV | 970 | 22.7 | 22.5 | 30 |
| 22 | −6 kV | 940 | 16.0 | 42.5 | 40 |
| | +6 kV | 1100 | 21.8 | 25.0 | 30 |
| 23 | −6 kV | 930 | 29.0 | >1000 | |
| | +6 kV | 1130 | 16.8 | 590.0 | |
| Control | −6 kV | 580 | 45.7 | 3.8 | 3 |
| | +6 kV | 620 | 43.5 | 1.5 | 5 |

These results demonstrate that the compounds have utility as charge generators and also that they are generally superior in this respect under positive charging conditions, as evidenced by the higher surface voltage, lower dark decay, improved sensitivity and lower residual voltage compared with the equivalent results under negative charging. When tested using narrow band-pass interference filters in the light source, peak sensitivity was found in the range 750–850 nm.

PROPERTIES OF CHARGE GENERATORS

Charge Generators 1 to 18 have the properties set out in Table 2. Absorption maxima were measured as solutions in chloroform (Chlor), toluene (Tol) or after deposition on glass (Glass) unless otherwise indicated. Extinction coefficients were determined in toluene or the only solvent in which the absorption maximum was recorded.

TABLE 4

| CG | Absorption Maxima (nm) | | | Extinction Coefficient | Melting Point (°C.) |
|---|---|---|---|---|---|
| | Chlor | Tol | Glass | | |
| 1 | 769 | — | 792 | — | 223 |
| 2 | 800 | 797 | 832 | 94,000 | >200 |
| 3 | 804 | 807 | 827 | — | >250 |
| 4 | 846 | 852 | 860 | 95,000 | 145–150 |
| 5 | 801 | 802 | — | — | >250 |
| 6 | 805 | 808 | 830 | 149,000 | >250 |
| 7 | 802 | 800 | 819 | 157,600 | 230 |
| 8 | 809 | — | 823 | 136,500 | 250 |
| 9 | 807 | — | 817 | 147,000 | 95/35 |
| 10 | 802 | 802 | — | 162,500 | <30 |
| 11 | 809 | 805 | 815 | 129,000 | <30 |
| 12 | 803 | 797 | 815 | 115,500 | <30 |
| 13 | 812 | 810 | 818 | 120,000 | 289 |
| 14 | 818 | 811 | — | 127,000 | <30 |
| 15 | 805 | 801 | — | 133,000 | 260–280 |
| 16 | 810 | 809 | — | 84,000 | 100–180 |
| 17 | 790 | — | — | — | — |
| 18 | 740 | — | — | — | — |

We claim:

1. An organic photoconductor comprising an electrically conducting support, a charge generating phase comprising a charge generator and a charge transport phase characterized in that the charge generator is a phthalocyanine compound in which each of at least four of the peripheral carbon atoms numbered from 1 to 16 in the phthalocyanine nucleus shown below is linked, by an atom selected from the group consisting of oxygen, sulphur, selenium, tellurium, and nitrogen or a mixture thereof, to a carbon atom of an organic radical

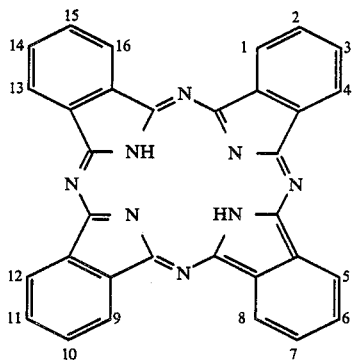

2. An organic photoconductor according to claim 1 wherein each of fifteen or sixteen of the peripheral carbon atoms of the phthalocyanine nucleus is linked to an organic radical by an atom from Group VA or Group VIA.

3. An organic photoconductor according to claim 1 wherein the charge generatore conforms to the formula:

$M_kPc(-XR)_n$ or $M_kPc(X-Q-X)_p(-XR)_q$ wherein

M is hydrogen, a metal atom, a halogeno-metal group or an oxy-metal group k is the inverse of half the valency of M;

Pc is the phthalocyanine nucleus;

X is oxygen, sulphur, selenium, tellurium or NT where T is H, alkyl or aryl or mixtures thereof;

each R independently is a monovalent organic radical;

or R and T together form an aliphatic or aromatic ring;

n is 15 or 16;

Q is a divalent organic radical;

p is an integer from 1 to 8;

q is an integer from 0 to 14;

and 2p+q is 15 or 16.

4. An organic photoconductor according to any one of claims 1 to 3 wherein the monovalent or divalent organic radical is an aromatic group selected from the group consisting of phenyl, phenylene, naphthyl, naphthylene, pyridyl, thiophenyl, furyl, pyrimidyl, benzimidazolyl and benzo- thiazolyl, each of which is unsubstituted or substituted by a group selected from alkyl, alkenyl, alkoxy and alkylthio, containing up to 20 carbon atoms, and halo substituted derivatives thereof; phenyl; phenylthio; halogen; nitro; cyano; carboxyl; benzyl; phenyl- or $C_{1-4}$-alkyl-sulphonamido; phenyl- or $C_{1-4}$-alkyl- sulphone; phenyl- or $C_{1-4}$-alkyl-sulphoxide; hydroxy; amino; mono- or di-phenylamino; mono- or di-($C_{1-4}$-alkylamino; and N-phenyl-N-($C_{1-4}$-alkyl)-amino.

5. An organic photoconductor according to any one of claims 1 to 3 wherein the monovalent organic radical is an aliphatic or cycloaliphatic group selected from $C_{1-20}$-alkyl, $C_{2-20}$-alkenyl, $C_{4-8}$-cycloalkyl and $C_{4-8}$-cycloalkenyl.

6. An organic photoconductor according to any one of claims 1 to 3 wherein each peripheral carbon atom of the phthalocyanine nucleus is linked to a different organic radical.

7. An organic photoconductor according to claim 1 or claim 2 wherein a divalent organic radical is linked to two adjacent peripheral carbon atoms through two atoms from Group VA and VIA.

8. An organic photoconductor according to any one of claims 1 to 3 wherein there are two different atoms from Group VA and VIA linking the peripheral carbon atoms of the phthalocyanine nucleus to the organic radicals.

9. An organic photoconductor according to any one of claims 1 to 3 wherein the phthalocyanine nucleus is metal-free.

10. An organic photoconductor comprising an electrically conducting support, a charge generating phase comprising a charge generator, said charge generator being pentadeca(isopropylthio)mono(isoamyloxy)-dihydrogenphthalocyanine and a charge transport phase.

* * * * *